United States Patent Office 2,860,141
Patented Nov. 11, 1958

2,860,141

INTERMEDIATE FOR PYRIDOXINE AND PROCESS

Clifford E. Larrabee, New London, Conn., assignor to Chas. Pfizer & Co., Brooklyn, N. Y., a corporation of Delaware No Drawing. Application May 15, 1957
Serial No. 659,214

7 Claims. (Cl. 260—295.5)

This invention is concerned with a novel method for the preparation of a valuable intermediate for the vitamin, pyridoxine. In particular, it is concerned with a method for the catalytic reduction of 2-methyl-3-nitro-5-cyano-6-chloropyridine-4-carboxylic acid or an ester thereof under conditions such that a novel and highly useful intermediate for pyridoxine is produced. This intermediate is 2-methyl-3-amino-6-chloropyridine-4,5-dicarboxylic acid.

Pyridoxine may be prepared from the valuable new intermediate of this invention by removing the halogen from the pyridine ring. This is accomplished by reduction with such an agent as hydrogen with a catalyst in the presence of a strong alkali. In the next step the amino group of the intermediate is treated with nitrous acid to convert it to the hydroxy group. These process steps may be used in either order, that is, the reduction first followed by diazotization or the diazotization first followed by reduction. The resulting product, 2-methyl-3-hydroxypyridine-4,5-dicarboxylic acid or an ester thereof may be reduced to pyridixone by a process such as is described in the copending patent application, Serial No. 631,402, filed on December 31, 1956, now abandoned.

The process of the present invention is conducted under conditions such that not only is reduction of the nitro group of the pyridine derivative achieved but, simultaneously, hydrolysis of the cyano group and an ester group, without affecting the halogen. This combination of effects is achieved without appreciable loss of the valuable product due to decarboxylation or other similar reactions which tend to occur with pyridine compounds of analogous structure. Favorable yields are achieved under relatively simple conditions in the present process and there is made available a valuable new intermediate for the preparation of pyridoxine by the route described above. The process of the present invention and the novel intermediate (II) are represented as follows. In the formulas R represents H or an alkyl or substituted alkyl group.

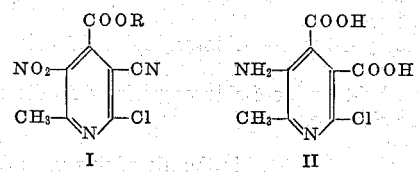

The present process utilizes as starting material a known compound (I), that is, an ester of 2-methyl-3-nitro-5-cyano-6-chloropyridine - 4 - carboxylic acid. This compound is subjected to hydrogenation using a noble metal catalyst such as platinum, platinum oxide, palladium-on-charcoal, palladium-on-kieselguhr, or other comparable noble metal catalyst. The reaction is conducted in an aqueous solution of a non-oxidizing, strong mineral acid, such as hydrochloric acid, hydrobromic acid, sulfuric acid, etc. In general, the concentration of the acid should be from about 10% to about 30%. However, the most useful concentration will vary somewhat with the individual acid. This may be determined with relative ease. In general, a concentration of the starting material in the aqueous acid of from about 1 to about 10% is used. If an insoluble salt of either the starting material or the product is formed with the chosen mineral acid, it may be necessary to use a relatively dilute solution of the starting material in the chosen aqueous acid. Alternatively, the temperature of the reaction mixture may be elevated to obtain an increase in solubility.

In general, the reaction of the present invention is conducted at a temperature in the range of from about 0 to about 100° C. and a temperature in the range of from about 25° to 50° C. is more satisfactory.

The catalyst used in the present process, as noted above, is one of the noble metal catalysts and it is preferably present in the reaction mixture at a concentration (based on its content of the catalytically active metal) of from about 5% to about 100% by weight of the starting pyridine compound. The ratio of catalyst to starting material is not critical.

In general it is not necessary to use an appreciably elevated hydrogen pressure to achieve the reaction of the present invention. In fact pressures from somewhat less than 1 atmosphere to several atmospheres are quite satisfactory. The reaction is favored by vigorous agitation of the reaction mixture to achieve good contact of hydrogen and pyridine compound and the reaction is often completed in one to a few hours' time.

As noted above, in addition to the use of the 2-methyl-3-nitro-5-cyano - 6 - chloropyridine - 4 - carboxylic acid as starting material, an ester of such material may be used. The ester may be conveniently prepared from the acid starting material or it may be formed directly during the preparation of the starting material. A variety of different esters of the pyridinecarboxylic acid may be used. This includes lower aliphatic carbinol esters such as the methyl, ethyl, propyl, butyl, and amyl esters; arylalkanol esters such as the benzyl ester, phenethyl ester, phenylpropyl ester; cycloalkanol esters such as the cyclopentanol ester, cyclohexanol ester, etc. In general it is advisable to have from about one to about ten carbon atoms in the alcohol group of the ester.

The product obtained by the process of the present invention is often isolable merely by filtering the catalyst from the solution after hydrogenation followed by cooling the solution. This is particularly true if hydrogenation is conducted at an elevated temperature with a solution of reasonable concentration. The product separates in the form of a crystalline acid salt of 2-methyl-3-amino-6-chloropyridine-4,5-dicarboxylic acid. Alternatively, if a more dilute solution is used for the process, the filtered solution of the product obtained after hydrogenation is concentrated by evaporation whereupon the product crystallizes, particularly if the reaction mixture is cooled. If it is desired to obtain the free dicarboxylic acid rather than an acid salt thereof, the acid salt is heated in water, particularly if the acid is a volatile one such as hydrochloric acid, and the free 2-methyl-3-amino-6-chloropyridine-4,5-dicarboxylic acid is obtained. Alternatively, the acid salt is treated in water with one mole of a soluble alkali such as sodium hydroxide, lithium hydroxide, or potassium hydroxide. This neutralizes the mineral acid combined with the pyridine compound, and the free dicarboxylic acid is obtained. Free dicarboxylic acid, that is, 2-methyl-3-amino-6-chloropyridine-4,5-dicarboxylic acid has a melting point of 217.8 to 218.2° C. with decomposition. The hydrochloride thereof crystallizes from water as a yellow, solid, monohydrate which has a melting point of 211.8 to 216° C. The free acid may, of course, be converted to metal salts or acid addition salts by contacting it with the appropriate reagent, e. g., sodium hydroxide, potassium hydroxide, sulfuric acid, etc.

It should be noted that it is highly unexpected that 2-methyl-3-amino-6-chloropyridine-4,5-dicarboxylic acid, or an acid salt thereof is formed by the process of the present invention. This is readily seen from the fact that when 2-methyl-3-nitro-5-cyano-6-chloropyridine-4-carboxylic acid methyl ester is heated with aqueous hydrochloric acid, the methyl ester fails to hydrolyze and the cyano group does not hydrolyze to a carboxylic acid group but rather the chloro group is hydrolyzed with the formation of the corresponding 6-hydroxy compound or the isomeric pyridine, that is, 2-methyl-3-nitro-5-cyano-6-pyridine-4-carboxylic acid methyl ester. This is a highly undesirable result, since the starting material for the reaction of this invention is prepared by chlorination of a pyridone and these conditions result in the reversal of the process. It should further be noted that when an attempt is made to hydrolyze 2-methyl-3-amino-5-cyano-6-chloropyridine-4-carboxylic acid methyl ester by the same method, this compound, which might be expected to occur as an intermediate in the present process, is not hydrolyzed even after prolonged refluxing with hydrochloric acid. Thus, neither the cyano group nor the carbalkoxy group of the starting material of the present process is hydrolyzed under the conditions of the process in the absence of catalyst and hydrogen nor is the amino compound corresponding thereto hydrolyzed. Yet when the process is conducted under the present hydrogenation conditions, the nitro group is reduced, the carbalkoxy group is hydrolyzed, and the cyano group is hydrolyzed, but the chloro group is not hydrolyzed. This is a highly unexpected and very desirable effect. Furthermore under other hydrogenation conditions than those of the present invention the halogen is removed, the nitro group is reduced, but the cyano and ester groups are unaffected. Under still other conditions the nitro group above is reduced.

The following examples are given solely for the purpose of illustration and are not to be construed as limitations of this invention, many variations of which are possible without departing from the spirit or scope thereof.

*Example I*

A slurry of 12.8 g. (0.05 mole) 2-methyl-3-nitro-4-carbomethoxy-5-cyano-6-chloropyridine, 100 ml. concentrated hydrochloric acid, 100 ml. water and 0.10 grams Adams platinum oxide catalyst was shaken with hydrogen at 25–54° C. and at 40.0 to 27.1 p. s. i. until the absorption of hydrogen ceased. Then the catalyst was removed from the hot mixture by filtration, and the filtrate was chilled thoroughly to precipitate a yellow solid which was collected by filtration and dried thoroughly. This gave 12.0 g. (84% of the theoretical amount) of 2-methyl-3-amino-6-chloropyridine-4,5-dicarboxylic acid hydrochloride monohydrate, M. P. 211.8–216.0° C.

*Analysis.*—Calcd. for $C_8H_7N_2O_4Cl \cdot HCl \cdot H_2O$: C, 33.70; H, 3.54; N, 9.83; Cl (ionic) 12.44; neut. equiv. 95.03; $H_2O$, 6.32. Found: C, 33.16; H, 3.60; N, 9.44; Cl, 12.3; N. E. 96.5; $H_2O$, 6.63.

*Example II*

To 1000 ml. of hot water there was added 200 g. (0.702 mole) of 2-methyl-3-amino-6-chloropyridine-4,5-dicarboxylic acid hydrochloride monohydrate. This mixture was boiled for 15 minutes and then cooled thoroughly at ice-bath temperature before the insoluble solid was filtered off, washed on the filter with one liter cold water and dried to constant weight at reduced pressure in the presence of phosphorus pentoxide. This produced 155.0 g. (95.7 percent of the theoretical amount) of 2-methyl-3-amino-6-chloropyridine-4,5-dicarboxylic acid, M. P. 217.8–218.2° C. (dec.).

*Analysis.*—Calcd. for $C_8H_7N_2O_4Cl$: C, 41.66; H, 3.06; N, 12.15; N. E. 115.3. Found: C, 41.35; H, 2.90; N, 11.91; N. E. 116.0.

*Example III*

The process of Example I was repeated using 2 grams of 5% palladium-on-charcoal catalyst. The product was recovered in the same manner. When platinum on charcoal catalyst was used the same product was formed.

*Example IV*

The process of Example I was repeated utilizing in place of the concentrated hydrochloric acid and water 40 ml. of concentrated sulfuric acid and 180 ml. of water. The sulfate of 2-methyl-3-amino-6-chloropyridine-4,5-dicarboxylic acid was obtained.

*Example V*

The process of Example I was repeated using in place of the methyl ester, 2-methyl-3-nitro-4-carbobenzyloxy-5-cyano-6-chloropyridine. The product, 2-methyl-3-amino-6-chloropyridine-4,5-dicarboxylic acid, was recovered by concentrating the hot filtered solution.

*Example VI*

The process of Example IV was repeated using 2-methyl-3-nitro-4-carbobutyloxy-5-cyano-6-chloro-pyridine in place of the methyl ester. The same product was isolated.

*Example VII*

Example I was repeated using hydrobromic acid rather than hydrochloric acid. The hydrobromide of 2-methyl-3-amino-6-chloropyridine-4,5-dicarboxylic acid was isolated.

What is claimed is:

1. A process for the preparation of 2-methyl-3-amino-6-chloropyridine-4,5-dicarboxylic acid which comprises contacting a 2-methyl-3-nitro-5-cyano-6-chloropyridine-4-carboxylic acid ester with hydrogen in the presence of a noble metal catalyst and in an aqueous solution of a mineral acid.

2. A process for the preparation of 2-methyl-3-amino-6-chloropyridine-4,5-dicarboxylic acid which comprises reacting a 2-methyl-3-nitro-5-cyano-6-chloropyridine-4-carboxylic acid ester with hydrogen in the presence of a noble metal catalyst and in an aqueous solution of a non-oxidizing, strong mineral acid and converting the thus formed salt to the free acid.

3. A process as claimed in claim 2 wherein the catalyst is chosen from the group consisting of platinum, platinum oxide, and palladium.

4. A process as claimed in claim 2 wherein the mineral acid solution is an aqueous solution of an acid chosen from the group consisting of hydrochloric acid, hydrobromic acid and sulfuric acid, in a concentration of from about 10% to about 30% by weight.

5. A compound chosen from the group consisting of 2-methyl-3-amino-6-chloropyridine-4,5-dicarboxylic acid and the salts thereof.

6. 2-methyl-3-amino-6-chloropyridine-4,5-dicarboxylic acid.

7. 2-methyl-3-amino-6-chloropyridine-4,5-dicarboxylic acid hydrochloride.

References Cited in the file of this patent

UNITED STATES PATENTS

| | | |
|---|---|---|
| 2,520,038 | Hultquist et al. | Aug. 22, 1950 |
| 2,650,232 | Jones | Aug. 25, 1953 |

FOREIGN PATENTS

| | | |
|---|---|---|
| 567,611 | Great Britain | Feb. 23, 1945 |

OTHER REFERENCES

Jones et al.: J. Am. Chem. Soc., vol. 73, pages 107–9, 5610–14 (1951).

UNITED STATES PATENT OFFICE
CERTIFICATE OF CORRECTION

Patent No. 2,860,141                                            November 11, 1958

Clifford E. Larrabee

It is hereby certified that error appears in the printed specification of the above numbered patent requiring correction and that the said Letters Patent should read as corrected below.

Column 3, line 14, for "pyridine", second occurrence, read -- pyridone --

Signed and sealed this 31st day of March 1959.

(SEAL)
Attest:
KARL H. AXLINE
Attesting Officer

ROBERT C. WATSON
Commissioner of Patents